United States Patent
Pruett

(10) Patent No.: US 6,807,324 B2
(45) Date of Patent: Oct. 19, 2004

(54) METHOD AND APPARATUS FOR CALIBRATING A DISTRIBUTED TEMPERATURE SENSING SYSTEM

(75) Inventor: Phillip E. Pruett, Richmond, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 146 days.

(21) Appl. No.: 10/153,199

(22) Filed: May 21, 2002

(65) Prior Publication Data

US 2003/0219190 A1 Nov. 27, 2003

(51) Int. Cl.[7] ............................................... G02B 6/00
(52) U.S. Cl. ................................................ 385/12; 385/13
(58) Field of Search ..................................... 385/12, 13

(56) References Cited

U.S. PATENT DOCUMENTS

| | | | | |
|---|---|---|---|---|
| 5,547,545 A | * | 8/1996 | Egi et al. ..................... | 162/238 |
| 6,024,488 A | * | 2/2000 | Wu et al. ..................... | 374/161 |
| 6,104,846 A | * | 8/2000 | Hodgson et al. ............... | 385/12 |
| 6,140,810 A | * | 10/2000 | Bohnert et al. ................ | 324/96 |
| 6,338,275 B1 | * | 1/2002 | Soares .......................... | 73/805 |
| 6,504,616 B1 | * | 1/2003 | Haber et al. .................. | 356/519 |
| 6,618,677 B1 | * | 9/2003 | Brown ......................... | 702/13 |
| 2003/0122535 A1 | * | 7/2003 | Williams et al. ............ | 324/107 |

FOREIGN PATENT DOCUMENTS

GB          2140554 A      11/1984    ........... G01K/11/00

* cited by examiner

*Primary Examiner*—John D. Lee
*Assistant Examiner*—Tina M Lin
(74) *Attorney, Agent, or Firm*—Moser, Patterson & Sheridan, L.L.P.

(57) ABSTRACT

A method and apparatus for calibrating a Distributed Temperature Sensing (DTS) system. One or more discrete temperature sensors are positioned adjacent to a DTS fiber to calibrate data generated from DTS fiber. The discrete temperature sensors preferably comprise FBG (Fiber Bragg Grating) sensors.

45 Claims, 4 Drawing Sheets

US 6,807,324 B2

METHOD AND APPARATUS FOR CALIBRATING A DISTRIBUTED TEMPERATURE SENSING SYSTEM

FIELD OF THE INVENTION

The present invention relates generally to fiber optic temperature sensing in well bores and, more particularly, to a device and method for calibrating a Distributed Temperature Sensing (DTS) fiber deployed for same.

BACKGROUND OF THE INVENTION

Distributed Temperature Sensing (DTS) is one method of monitoring temperature along the length of a well bore. DTS employs an optical fiber as both the communication line and the temperature sensor. A fiber optic cable is installed along the length of a well. A laser or other light source at the surface of the well transmits a pulse of light into the fiber. The light pulse excites atoms as it propagates through the fiber, causing the stimulated atoms to, among other activity, reflect detectable light back towards the surface for detection. The frequency of the reflections relative to the pulsed light are shifted in accordance with the temperature of the atoms along the fiber. These reflections are processed as a function of time to derive temperature as a function of well depth, with earlier reflections indicating the temperature at relatively shallow depths, and later reflections indicating the temperature at relatively deep depths. Such time-to-depth conversion is possible because the speed at which light travels through the fiber is known. Temperature may be derived from the reflections by computing the ratio of intensities between selected wavelengths in the reflections (e.g., through Raman back scattering analysis). Raman back scattering analysis is discussed, for example, in U.K. Patent Application 2,140,554, published November, 1984, which is hereby incorporated by reference in its entirety. Through systematic pulses, the processor is able to monitor temperature along the entire length of the fiber. Hence, the optic fiber acts as a temperature sensor, permitting the reading of temperature gradients and changes throughout the well.

However, DTS fiber may degrade. The most common reason why DTS fiber degrades is the absorption of hydrogen. Although DTS fiber is individually cladded and may be hermetically sealed within a bundle of fibers in a cable, hydrogen is eventually absorbed into the DTS fiber. Hydrogen causes the fiber to "darken." Hydrogen in glass absorbs light, turning it into heat and thus attenuating the light. Such degradation is aggravated by temperature.

Degradation of DTS fiber may yield unpredictable (incorrect) temperature measurements. As DTS fiber degrades, the rates of change in the intensity of reflections at different wavelengths are neither uniform nor predictable. Moreover, DTS fiber is not guaranteed to degrade uniformly. Conditions vary along the length of a borehole and, therefore, along the length of the DTS fiber. While conditions near the surface may be hospitable, at depth the temperature may reach 200 degrees Celsius, accompanied by pressure of 15,000 psi (pounds per square inch).

Heretofore, corrupted DTS fiber has been unwittingly used or discarded and replaced if it is discovered to be the culprit in producing corrupt data. However, extracting and installing fiber optic cable is costly. Moreover, extracted cable is generally not reusable.

A further problem with the deployment of extremely long DTS fiber is noise. The longer the fiber, the greater the noise. This can be visualized on a plot of temperature versus length. As the length of the fiber increases (i.e. as the distance from the light source and light detector on the surface increases), the plotted temperature becomes progressively more jittery.

Thus, there exists a need to detect the degree of degradation of DTS fiber and/or noise and to adjust for it, i.e., to calibrate the DTS system. Such an improvement would add greater confidence in accuracy and reliability of a DTS fiber.

The present invention is directed to overcoming, or at least alleviating, one or more of the problems set forth above.

SUMMARY OF THE INVENTION

A method and apparatus for calibrating a DTS system. One or more discrete temperature sensors are positioned adjacent to a DTS fiber to calibrate data generated from DTS fiber. The discrete temperature sensors preferably comprise FBG (Fiber Bragg Grating) sensors.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

In the disclosure that follows, in the interest of clarity, not all features of actual implementations of a DTS calibration system are necessarily described. It will of course be appreciated that in the development of any such actual implementation of the invention, as in any such project, numerous engineering and design decisions must be made to achieve the developers' specific goals and subgoals (e.g., compliance with mechanical- and business-related constraints), which will vary from one implementation to another. While attention will necessarily be paid to proper engineering and design practices for the environment in question, and while such a development effort might be complex and time-consuming, a development effort for a DTS calibration system would nevertheless be a routine undertaking for those of skill in the art given the benefit of this disclosure.

Figure 1:
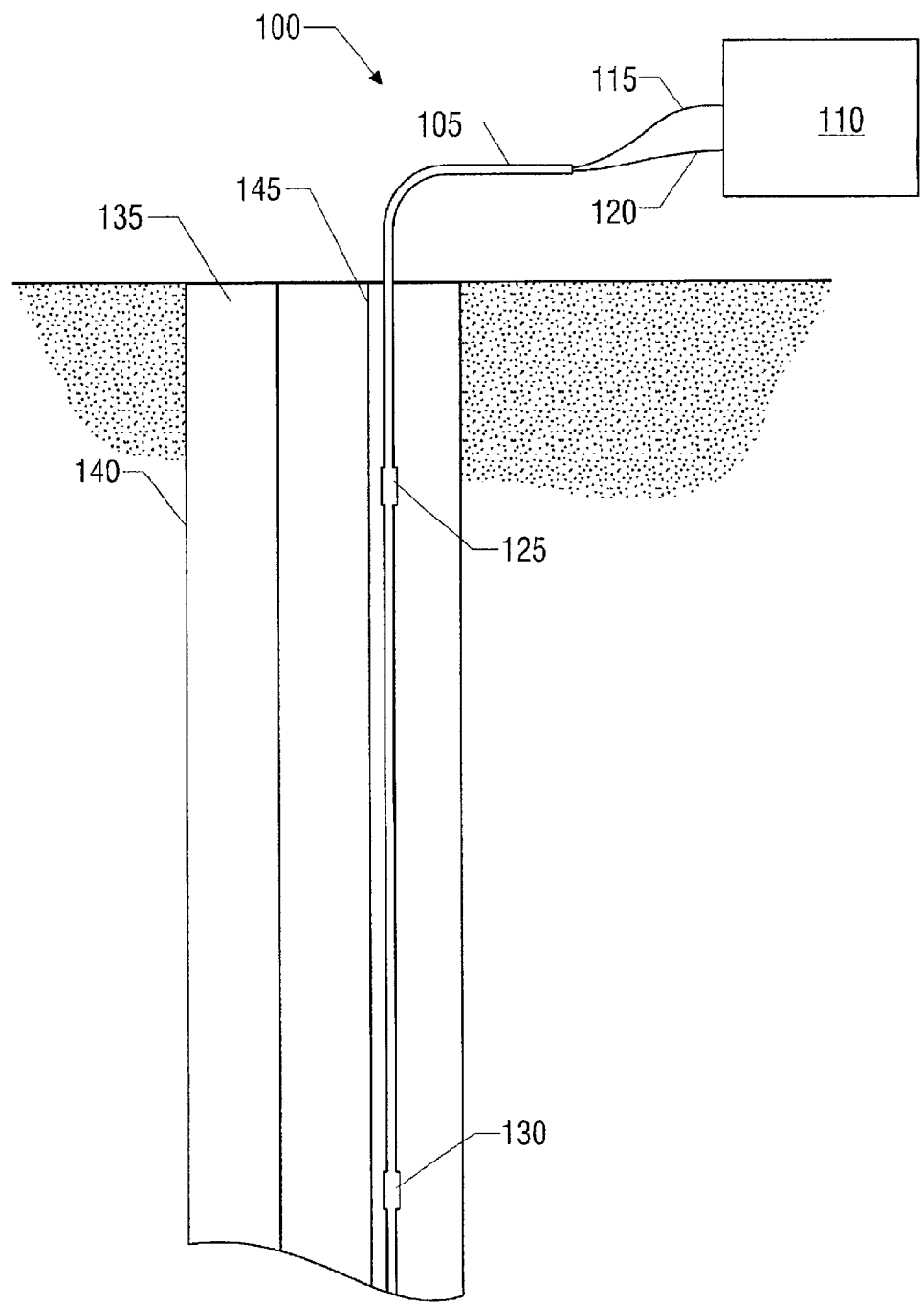
FIG. 1 depicts an embodiment of a DTS calibration system in accordance with the invention.

FIG. 1 depicts an embodiment of a DTS calibration system in accordance with the invention. DTS calibration system 100 comprises cable 105 and DTS calibration apparatus 110. Cable 105 comprises DTS fiber 115 and at least one calibration fiber 120 that is coupled to calibration sensors 125, 130. FIG. 1 depicts cable 105 deployed in wellbore 135 having well casing 140 and production tube 145. Cable 105 is shown installed exterior and adjacent to production tube 145, although different installations are possible and obvious to one of skill in the art, e.g., inside production tube 145, or on or in a pipe as opposed to a well.

DTS fiber 115 is well known and may be constructed in accordance with the prior art, e.g., 50/125 multi-mode fiber. Calibration fiber 120 preferably comprises an optical fiber, and sensors 125, 130, preferably constitute Fiber Bragg Grating (FBG) sensors formed in the optical fiber. However, other well-known temperature sensors may be used as well, e.g., electronic temperature sensors such as thermocouples or platinum resistance sensors. In the event one or more non-optical calibration sensors are used, calibration line 120 may also be non-optical, e.g., copper wire.

FBGs are well-known in the art for their utility as pressure and temperature sensors, and for a discussion of the construction and various uses for FGBs, the reader is referred to the following U.S. Patent application serial numbers, which are presently assigned to the assignee of the instant application and which are hereby incorporated by reference in their entirety: 09/726,061, 09/740,760, 09/740,757, 09/726,059, 09/726,062, 09/726,060, 09/497,237, 09/344,070, 09/399,403, 09/497,236, 09/346,607, 09/612,775, 09/344,093, 09/345,827, 09/519,785, 09/346,606, 09/346,604, 09/594,645, 09/628,264, 09/445,113, 09/494,417, 09/410,634, 09/346,605, 09/440,555, 09/145,624, 09/326,097, 09/146,017, 09/360,879, 09/326,089, 08/880,208, 08/925,598, 09/222,637, 08/853,762, 08/853,535, 08/853,402, 60/266,667, 09/455,867, 09/344,094, and 09/344,069.

As one or more of these patent applications explain, FBGs contain a grating written into the optical fiber at a set spacing. The spacing of these gratings determines the wavelength of the light that is reflected from the grating. Thus, if the grating changes shape, either because it is mechanically stressed or changes size via thermal expansion effects, the spacing between the gratings, and hence the reflected wavelength of light will change, allowing the gratings to function as temperature or pressure sensors.

FBG sensors are less susceptible to producing incorrect data by degradation because derivation of pressure or temperature from FBG sensors is based on wavelength, as opposed to the ratio of two intensities at selected wavelengths as with a DTS sensing system. Thus, if FBG fiber degrades, a useful signal can still be achieved, although reflected signals may require increased amplification over the course of the use of the fiber.

As explained in one or more of the above-incorporated patent applications, FBGs are also useful in that they are easily multiplexed to form an array of sensors such that one sensor does not appreciably interfere with the other sensors in the array. Thus, sensors having different spacings may be used in series in an optical cable, with each sensor providing reflections of a unique wavelength (an example of wavelength division multiplexing). Or, a pair of sensors, each having a different wavelength, can be formed on a coil of pure optical fiber which itself acts as the sensor. In this arrayed embodiment, the lengths of the cable between the pairs of gratings act as the sensors, which are stretched in accordance with pressure or temperature effects, and which accordingly causes reflected pulses to arrive at the source at differing times (an example of time division multiplexing).

Cable 105, in one embodiment, constitutes a cable having both the DTS cable 115 and the calibration fiber 120 inside it. The outside sheath of cable 10 is usually incoloy or stainless steel and is preferably ¼ inch in diameter. The thickness of the metal sheath is approximately 0.035 inch, 0.028 inch, or 0.049 inch. Depending on the environment in question, other materials could be used for the sheath, such as plastics, glasses, or ceramics, although metal is preferred for the particularly harsh environments occurring within a well bore for its heat transference properties and it mechanical resilience. In one embodiment, the DTS cable 115 and the calibration fiber 120 are positioned loosely within the sheath, i.e., nothing else appears inside the sheath, which is in effect a hollow tube. However, other materials may be placed in the tube, such as solid, liquid, or gel-based filing materials such as to mechanically stabilize 115 and 120 within the cable 105. Because the cable 105 measures temperature, one may need to consider the use of a filing material that is sufficient heat conductive to allow heat to readily transfer to the temperature measuring cables 115 and 120. In a preferred embodiment, the cable is formed without sensors 125, 130 therein, it being preferable to splice the cable 105 to insert these sensors where they are desired, as discussed below. Of course, the sensors could also be formed in the calibration fiber 120 before that fiber is installed in the cable 105.

Generally, cable 105 can be affixed adjacent the structures whose temperature is to be measured (e.g., production tube 145) in any number of well-known ways, such as by adhesives, by strapping, by wrapping, or by physical integration with the tube. Of course, the method chosen for affixing the cable 105 should depend on the environment in which the cable 105 will be placed, and suitable materials should be chosen to ensure that the cable 105 will be adequately held in place without corroding, thermally degrading, or being knocked loose by physical forces present in the environment. In a preferred embodiment, cable 105 is installed by clamping the cable to the pipe as it is placed in the well, e.g., using well-known collar protectors (not shown for clarity) used in the oil and gas industry. It should be noted that although FIG. 1 portrays cable 105 as containing both DTS fiber 115 and calibration fiber 120, there exist numerous alternatives within the purview of this invention. For example, DTS fiber 115 and calibration fiber 120 could be in separate adjacent cables. Calibration fiber 120, whether in the same cable or a different cable than DTS fiber 115, could be electrical wire, as in the case where at least one calibration sensor is a thermocouple.

Figure 2:
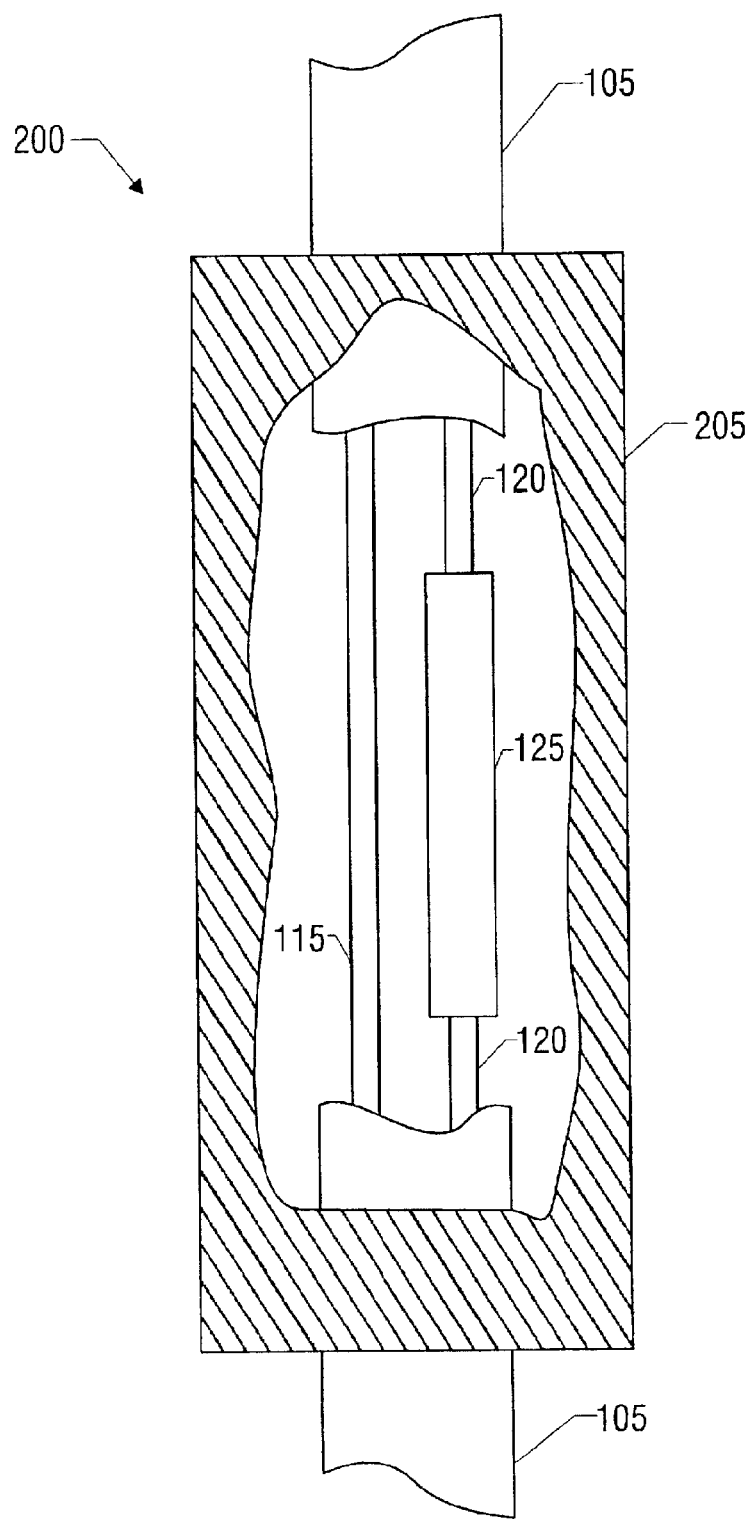
FIG. 2 depicts an embodiment of an installation of a calibration sensor in accordance with the invention.

As shown in FIG. 1, and in greater detail in FIG. 2, calibration sensors 125, 130 may each be installed within splice sleeves 205. This is accomplished, for example, as depicted by splice 200. Splice 200 involves cutting cable 105, fusion splicing optical calibration sensor 125 (e.g., FBGs) to either end of calibration fiber 120 protruding from the ends of cut cable 105 using well-known fiber optic cable splicing techniques, splicing any other fibers or wires within the cable, e.g., DTS fiber 115, and sealing the splice(s) and sensor 125 within splice sleeve 205.

Splice sleeve 205 comprise at least one protective solution, but other solutions may be appropriate depending on the type of cable 105 used. For example, for cable 105 having a ¼ inch metal sheath, splice sleeve 205 may comprise a ⅜ inch metal tube welded onto the ¼ inch metal sheath. Where cable 105 does not have a metal sheath, sleeve 205 may comprise a snap sleeve or heat shrink sleeve capable of providing a hermetic seal.

One skilled in the art will recognize that any number of calibration configurations is possible. Thus, one or more sensors may be deployed along calibration fiber 120, and in general, a more precise calibration may be obtained by deploying a plurality of sensors along the length of cable 105. When an optical fiber is used for calibration fiber 120, FBG sensors 125, 130 may be easily multiplexed as briefly described above and as further described in one or more of the above-incorporated patent applications. Also, there may be one or more calibration fibers 120 bundled in cable 105, each of which may contain any number of calibration sensors. Multiple calibration sensors 125, 130 may be spaced randomly or uniformly along the length of cable 105, and may constitute any number of sensors, or even a single sensor depending on the application.

Calibration apparatus 110 receives data originating from DTS fiber 115 and sensors 125, 130 and initially analyzes the data to form temperature data readings from both the DTS fiber and sensors 125, 130 within the calibration fiber 120. Calibration apparatus 110 may comprise a local or remote data logger, or other apparatus for receiving data from DTS fiber 115 and sensors 125, 130. Calibration apparatus 110 may comprise one or more units or an integrated unit. Those skilled in the art will recognize that there are a multitude of known techniques for gathering and processing DTS fiber data and also for gathering and processing data from discrete temperature sensors, such as FBGs. Equipment(s) capable of serving as calibration apparatus 110 and for receiving the data from the optical sensors 125, 130 includes Bragg grating equipment, which is available from Weatherford International, Inc. and Cidra Corporation. Equipment(s) capable of serving as calibration apparatus 110 and for receiving the data from the DTS fiber 115 includes equipment commonly available from Sensa (including York sensors, such as the York DTS-80) and Sumitomo Electric Industries.

DTS calibration apparatus 110 analyzes the data in order to confirm or, if necessary, adjust the data originating from DTS fiber 115. The data may be processed in real time or stored for subsequent processing. The analysis and calibration may be carried out, for example, by outputting temperature data from independent DTS and FBG data collection devices such as those mentioned above to a general purpose computer which assesses the data and performs the necessary calibration. The flowchart depicted in FIG. 3 represents one embodiment of such a calibration application.

Figure 3:
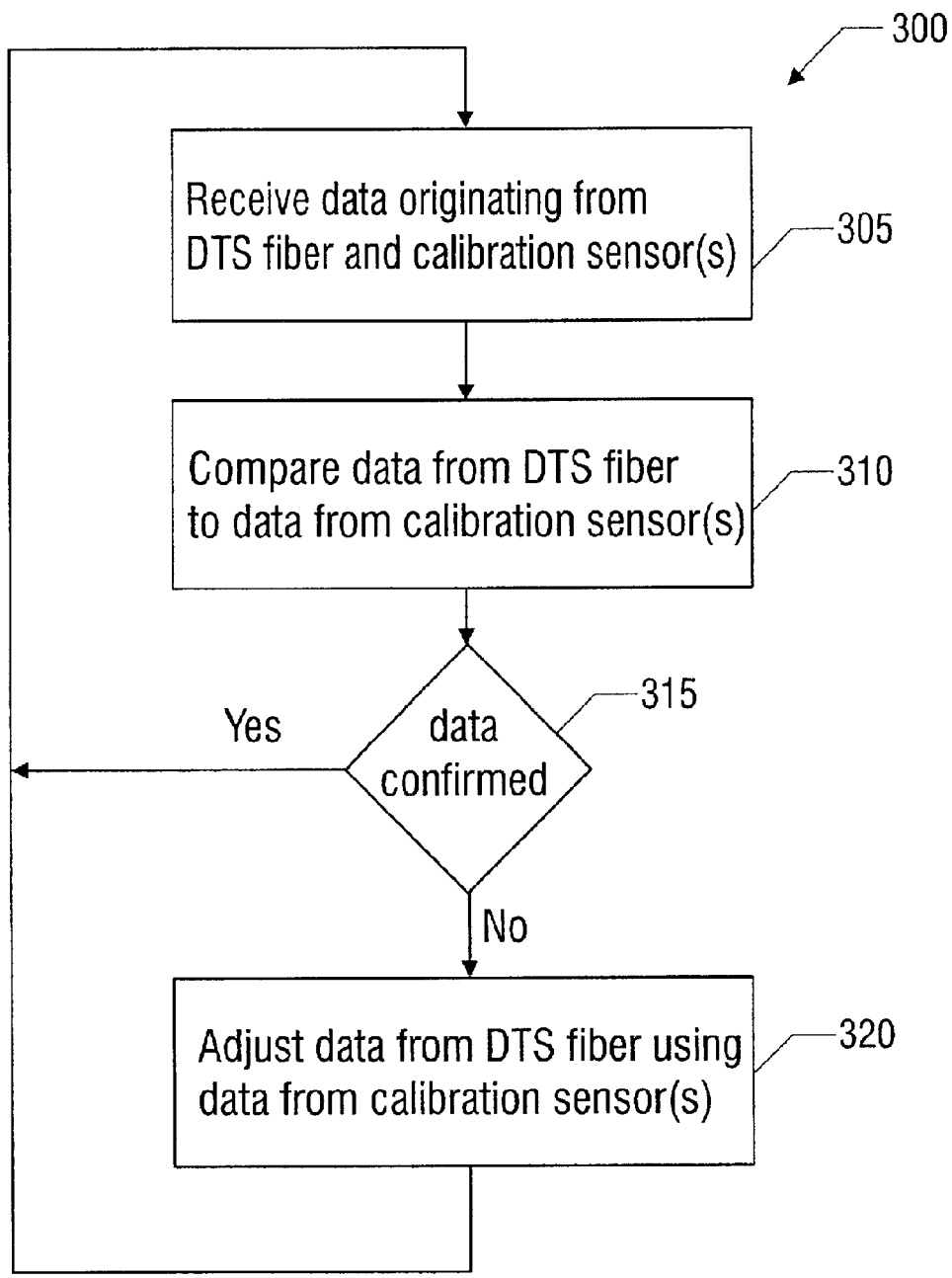
FIG. 3 depicts an embodiment of a method of calibrating DTS fiber temperature data in accordance with the invention.

FIG. 3 depicts a method of calibrating DTS fiber data in accordance with the invention. Calibration method (300) comprises the steps of (305) receiving data originating from DTS fiber 115 and calibration sensors 125, 130; (310) comparing data from DTS fiber 115 to data from calibration sensors, 125, 130; (315) if DTS data is confirmed then return to step (305), otherwise (320) adjusting DTS data using data from calibration sensors 125, 130.

The step of comparing data (310) comprises, for example, calculating the magnitude of variance between DTS data and calibration sensor data, which is preferably performed by the general-purpose computer portion of calibration apparatus 110. This step may include a graphical plot of DTS data and calibration sensor data on a computer display screen for human interpretation, such as that shown in FIG. 4 (400). A particular interpretation of the data may result in the selection of any one of a number of adjustments to the DTS data by the computer user.

The step of determining whether DTS data is confirmed to be correct (315) comprises, for example, determining whether variations between the DTS data and the calibration sensor data are within a predetermined permissible range. This step may include determinations of confidence, or a confidence level, in data collected from calibration sensors 125, 130. This may be based, in part or in full, on the magnitude of difference relative to sensors at various points along cable 105. For example, if all but one sensor indicate that the DTS fiber is accurate, then it may indicate that data from the discrete sensor is corrupt. A level of confidence may be implemented by the application running on the computer in the form of a weight factor attributable to a particular sensor or sensors.

The step of adjusting DTS data (320), in the event it is determined that adjustment is required, may be implemented in an infinite number of ways. For instance, assuming there is more than one calibration sensor, an average magnitude or percentage of magnitude variance between calibration sensor data and DTS data may be calculated and applied to the entire set of DTS data. This would result in the entire set of data being adjusted by a fixed magnitude or percentage of magnitude. Another method of adjusting DTS data would be, again assuming there is more than one calibration sensor, to incrementally average the magnitude or percentage magnitude difference for DTS data points between any two calibration sensor data points. Alternatively, each section of the DTS cable may be calibrated in accordance with the temperature reading from the sensor 125, 130 of that section. The adjusted data 445 may be displayed on a computer display screen, as depicted in FIG. 4.

The type of adjustment may depend on the apparent source of incorrect data. Incorrect data may be caused by noise, degradation, or DTS cable quality issues and/or imperfections. Noise tends to be more problematic at greater lengths. Thus, correction may not be necessary at shorter lengths. Such noise has traditionally been resolved by averaging data, but calibration will yield a more accurate indication of temperature than averaging. Empirical data, the age of the DTS fiber and other equipment, the manufacturer's failure data for equipment, and relative differences between the DTS data and the sensor calibration data, for example, may be used to determine the probable source of incorrect data such that the proper course of calibration can be taken.

Figure 4:
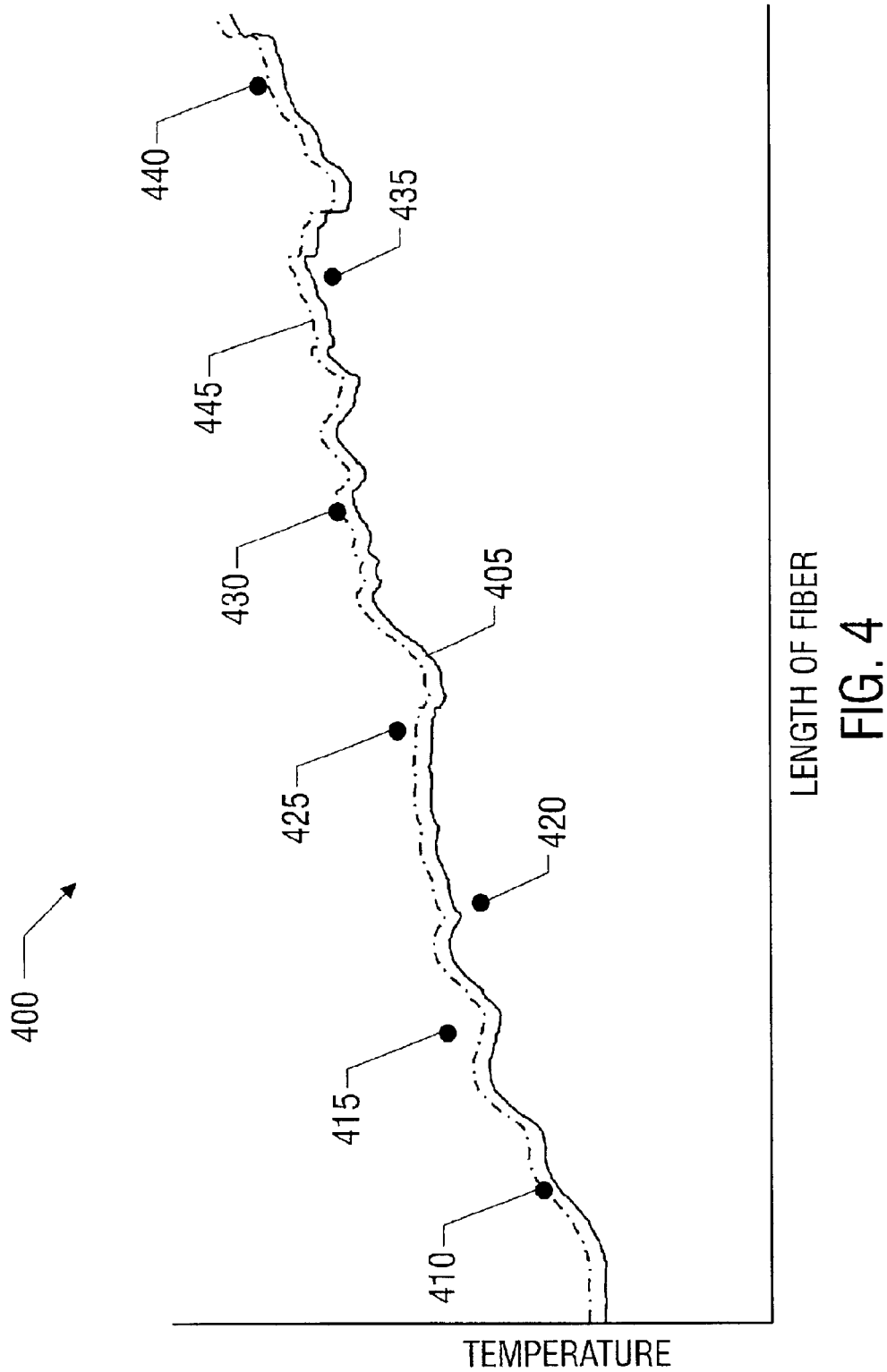
FIG. 4 depicts a temperature chart displaying an embodiment of DTS temperature calibration in accordance with the invention.

FIG. 4 depicts a temperature chart displaying DTS temperature data 405, discrete calibration sensor temperature data 410–440, and one embodiment of calibrated DTS temperature data 445. Calibration plot 445 represents an average of the magnitude of difference between DTS fiber data 405 and calibration sensor data 410–440. As previously mentioned, innumerable methods exist to adjust DTS temperature 405 using calibration sensor data 410–440.

It should be appreciated by those of ordinary skill that the disclosed embodiments could be implemented in a number of different ways. For example, while particularly useful for detecting the temperature down a wellbore, the disclosed inventive self-calibrating cable and system could be used to measure temperatures in any number of devices, such as along the ocean floor, around other types of pipes, on other pieces of large mechanical equipment whose temperature needs to be accurately measured, etc. Moreover, the way in which the cable is affixed to the device to be measured can easily be changed to fit the environment in question. Thus, when measuring the temperature at discrete positions along a pipe, the cable could be wound around the pipe or other piece of equipment instead of being affixed linearly to an edge of the pipe or equipment. Additionally, other types of calibrating temperature sensors could be used other than FBGs, such as thermocouples connected with conductive wires, although such devices may not be as easily multiplexed and may not be suitable for particularly harsh environments where reliability is a concern. Additionally, while the calibration of DTS cables is of particular concern to the present disclosure, the inventive calibration cable could be used in conjunction with other cables to calibrate other types of temperature measuring devices and arrays.

While the present invention has been described with particular embodiments, one should not understand these embodiments to limit the scope of the various aspects of the invention, which instead is defined by the following claim language and its equivalents.

What is claimed is:

1. A cable comprising:
    a distributed temperature sensing fiber; and
    at least one calibration line for calibrating the distributed temperature sensing fiber, wherein the calibration line is coupled to at least one discrete calibration temperature sensor.

2. The cable of claim 1, wherein at least one calibration line comprises optical fiber.

3. The cable of claim 2, wherein at least one discrete calibration sensor comprises a fiber Bragg grating.

4. The cable of claim 1, wherein a plurality of discrete calibration temperature sensors are spaced uniformly along the length of the distributed temperature sensing fiber.

5. The cable of claim 2, wherein the optical fiber comprises a splice for integrating at least one discrete temperature sensor into the calibration line.

6. The cable of claim 1, further comprising a sheath for housing the distributed temperature sensing fiber and the calibration line.

7. The cable of claim 6, wherein the sheath is metal.

8. The cable of claim 7, further comprising a jacket coupled to the sheath for covering at least one discrete calibration temperature sensor.

9. The cable of claim 1, wherein the calibration line is a wire.

10. The cable of claim 9, wherein at least one discrete calibration temperature sensor comprises an electrical temperature sensor.

11. A system for calibrating a distributed temperature sensing fiber, comprising:

a distributed temperature sensing fiber;

at least one discrete calibration temperature sensor in proximity to the distributed temperature sensing fiber; and a calibration system configured to receive temperature data from the distributed temperature sensing fiber and the at least one discrete calibration temperature sensor, and calibrate the distributed temperature sensing fiber data using the discrete calibration temperature sensor data.

12. The system of claim 11, wherein at least one discrete calibration temperature sensor is coupled to a calibration line.

13. The system of claim 12, wherein at least one calibration line comprises optical fiber.

14. The system of claim 13, wherein at least one discrete calibration sensor comprises a fiber Bragg grating.

15. The system of claim 11, wherein a plurality of discrete calibration temperature sensors are spaced uniformly along the length of the distributed temperature sensing fiber.

16. The system of claim 13, wherein the optical fiber comprises a splice for integrating at least one discrete temperature sensor into the calibration line.

17. The system of claim 12, wherein the distributed temperature sensing fiber and the calibration line are housed in a sheath.

18. The system of claim 17, wherein the sheath is metal.

19. The system of claim 18, further comprising a jacket coupled to the sheath for covering at least one discrete calibration temperature sensor.

20. The system of claim 12, wherein the calibration line is a wire.

21. The system of claim 20, wherein at least one discrete calibration temperature sensor comprises an electrical temperature sensor.

22. The system of claim 11, wherein the calibration apparatus comprises:

a computer for analyzing the temperature data from the distributed temperature sensing fiber and at least one discrete calibration temperature sensor, and for calibrating the distributed temperature sensing fiber data using the discrete calibration temperature sensor data.

23. The system of claim 11, further comprising a structure whose temperature is to be measured, and wherein the distributed temperature sensing fiber and at least one discrete calibration temperature sensor are positioned adjacent the structure.

24. The system of claim 23, wherein at least one discrete calibration temperature sensor is coupled to a calibration line.

25. The system of claim 23, wherein the structure is a well bore structure.

26. The system of claim 25, wherein the well bore structure is a production tube.

27. The system of claim 24, wherein the distributed temperature sensing fiber and at least one calibration line are affixed to the structure.

28. The system of claim 27, wherein the distributed temperature sensing fiber and at least one calibration line are affixed by adhesives, by strapping, by wrapping, or by physical integration with the structure.

29. The system of claim 24, wherein the distributed temperature sensing fiber and the calibration line are housed in a sheath.

30. A method for calibrating a distributed temperature sensing fiber, comprising:

receiving first temperature data from the distributed temperature sensing fiber;

receiving second temperature data from at least one discrete calibration temperature sensor placed proximate to the distributed sensing fiber; and adjusting, if necessary, the first temperature data using the second temperature data.

31. The method of claim 30, wherein at least one discrete calibration temperature sensor is coupled to a calibration line.

32. The method of claim 31, wherein at least one calibration line comprises optical fiber.

33. The method of claim 32, wherein at least one discrete calibration sensor comprises a fiber Bragg grating.

34. The method of claim 30, further comprising placing a plurality of discrete calibration temperature sensors at uniform spacings along the length of the distributed temperature sensing fiber.

35. The method of claim 31, further comprising housing the distributed temperature sensing fiber and the calibration line in a sheath.

36. The method of claim 35, wherein the sheath is metal.

37. The method of claim 31, wherein the calibration line is a wire.

38. The method of claim 30, wherein at least one discrete calibration temperature sensor comprises an electrical temperature sensor.

39. The method of claim 30, further comprising placing the distributed temperature sensing fiber and at least one discrete calibration temperature sensor adjacent to a structure whose temperature is to be measured.

40. The method of claim 39, wherein at least one discrete calibration temperature sensor is coupled to a calibration line.

41. The method of claim 38, wherein the structure is a well bore structure.

42. The method of claim 41, wherein the well bore structure is a production tube.

43. The method of claim 40, further comprising affixing the distributed temperature sensing fiber and the calibration line to the structure.

44. The method of claim 43, wherein affixing comprises the use of adhesives, straps, by wrapping, or by physical integration with the structure.

45. The method of claim 44, wherein the distributed temperature sensing fiber and the calibration line are housed in a sheath.

* * * * *